(12) United States Patent
Anderson et al.

(10) Patent No.: US 11,836,494 B2
(45) Date of Patent: *Dec. 5, 2023

(54) SYSTEM AND METHOD FOR ADDRESSING DATA IN MEMORY

(71) Applicant: TEXAS INSTRUMENTS INCORPORATED, Dallas, TX (US)

(72) Inventors: Timothy David Anderson, University Park, TX (US); Duc Quang Bui, Grand Prairie, TX (US); Joseph Zbiciak, San Jose, CA (US); Kai Chirca, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/387,450

(22) Filed: Jul. 28, 2021

(65) Prior Publication Data

US 2021/0357226 A1 Nov. 18, 2021

Related U.S. Application Data

(63) Continuation of application No. 16/421,920, filed on May 24, 2019, now Pat. No. 11,106,463.

(51) Int. Cl.
*G06F 12/06* (2006.01)
*G06F 9/30* (2018.01)

(52) U.S. Cl.
CPC ...... *G06F 9/30123* (2013.01); *G06F 9/30101* (2013.01); *G06F 9/30134* (2013.01)

(58) Field of Classification Search
CPC ............ G06F 9/30123; G06F 9/30101; G06F 9/30134

See application file for complete search history.

(56) References Cited

U.S. PATENT DOCUMENTS

| 3,560,935 | A | * | 2/1971 | Beers | G06F 9/4812 |
| | | | | | 710/262 |
| 4,240,139 | A | | 12/1980 | Fukuda et al. | |
| 5,642,489 | A | * | 6/1997 | Bland | G06F 13/4027 |
| | | | | | 710/308 |
| 5,944,841 | A | * | 8/1999 | Christie | G06F 11/3636 |
| | | | | | 714/E11.2 |
| 5,954,811 | A | * | 9/1999 | Garde | G06F 9/3824 |
| | | | | | 712/E9.046 |
| 6,038,661 | A | | 3/2000 | Yoshioka et al. | |
| 6,157,967 | A | * | 12/2000 | Horst | G06F 15/17381 |
| | | | | | 370/506 |
| 6,697,916 | B2 | * | 2/2004 | Lasserre | G06F 12/0879 |
| | | | | | 712/E9.033 |

(Continued)

*Primary Examiner* — Cheng Yuan Tseng
(74) *Attorney, Agent, or Firm* — Brian D. Graham; Frank D. Cimino

(57) ABSTRACT

A digital signal processor having a CPU with a program counter register and, optionally, an event context stack pointer register for saving and restoring the event handler context when higher priority event preempts a lower priority event handler. The CPU is configured to use a minimized set of addressing modes that includes using the event context stack pointer register and program counter register to compute an address for storing data in memory. The CPU may also eliminate post-decrement, pre-increment and post-decrement addressing and rely only on post-increment addressing.

20 Claims, 2 Drawing Sheets

(56) References Cited

U.S. PATENT DOCUMENTS

| | | | |
|---|---|---|---|
| 6,807,595 B2 | 10/2004 | Khan et al. | |
| 6,976,158 B2 * | 12/2005 | Catherwood | G06F 9/30065 |
| | | | 711/219 |
| 7,533,236 B1 | 5/2009 | Nordquist | |
| 7,533,237 B1 | 5/2009 | Nordquist | |
| 8,516,502 B2 * | 8/2013 | Chauvel | G06F 9/4812 |
| | | | 718/1 |
| 8,533,433 B2 | 9/2013 | Strom | |
| 9,256,369 B2 * | 2/2016 | Nazm Bojnordi | G11C 7/1072 |
| 9,606,803 B2 | 3/2017 | Anderson et al. | |
| 9,652,241 B2 * | 5/2017 | Morfey | G06F 9/342 |
| 10,489,188 B2 * | 11/2019 | Udava | G06F 9/4843 |
| 10,540,287 B2 | 1/2020 | Brekelbaum et al. | |
| 10,908,909 B2 * | 2/2021 | Moudgill | G06F 9/48 |
| 11,106,463 B2 * | 8/2021 | Anderson | G06F 9/30134 |
| 2006/0026390 A1 | 2/2006 | Cabillic et al. | |
| 2007/0277021 A1 | 11/2007 | O'Connor et al. | |

* cited by examiner

| BIT 63 - BIT 49 | BIT 48 - BIT 16 | BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|---|---|---|---|---|---|---|---|
| RESERVED | BASE (ECSP BASE ADDRESS, UPPER 33 BITS OF 49-BIT ADDR) | (NCNT) NEST COUNT | | | | RESERVED, NOT IMPLEMENTED | | | | | | | | | | | |
| | 21 | 22 | | | | | | | | | | | | | | | |

FIG. 2

SYSTEM AND METHOD FOR ADDRESSING DATA IN MEMORY

CROSS-REFERENCE TO RELATED APPLICATIONS

This application is a continuation of prior U.S. patent application Ser. No. 16/421,920, filed May 24, 2019, which is incorporated herein by reference in its entirety.

BACKGROUND

Modern digital signal processors (DSP) faces multiple challenges. Workloads continue to increase, requiring increasing bandwidth. Systems on a chip (SOC) continue to grow in size and complexity. Memory system latency severely impacts certain classes of algorithms. Moreover, modes for addressing data in memory may be complex and/or may not address the needs of many DSPs.

SUMMARY

Examples described herein include a method for addressing data in a memory. The method comprises using an event context stack pointer as a base address. Other examples described herein include a digital signal processor. The digital signal process comprises a CPU. The CPU comprises a program counter register, which the CPU is configured to use as a base address for storing data in memory. The CPU may in addition be configured to address memory using post-increment addressing, and not configured to address memory using pre-increment, pre-decrement or post decrement addressing. The CPU may also comprise an event context stack pointer register for saving and restoring event handler context when higher priority event preempts a lower priority event handler. The CPU may alternatively use the event context stack pointer register as a base address for storing data in memory.

Other examples described herein include a digital signal processor system. The digital signal processor system comprises a memory and a digital signal processor. The digital signal processor comprises a CPU. The CPU comprises a program counter register, which the CPU is configured to use as a base address for storing data in memory. The CPU may in addition be configured to address memory using post-increment addressing, and not configured to address memory using pre-increment, pre-decrement or post decrement addressing. The CPU may also comprise an event context stack pointer register for saving and restoring event handler context when higher priority event preempts a lower priority event handler. The CPU may alternatively use the event context stack pointer register as a base address for storing data in memory.

BRIEF DESCRIPTION OF THE DRAWINGS

For a detailed description of various examples, reference will now be made to the accompanying drawings in which:

FIG. 2 illustrates an exemplary event context stack pointer register.

DETAILED DESCRIPTION

Figure 1:
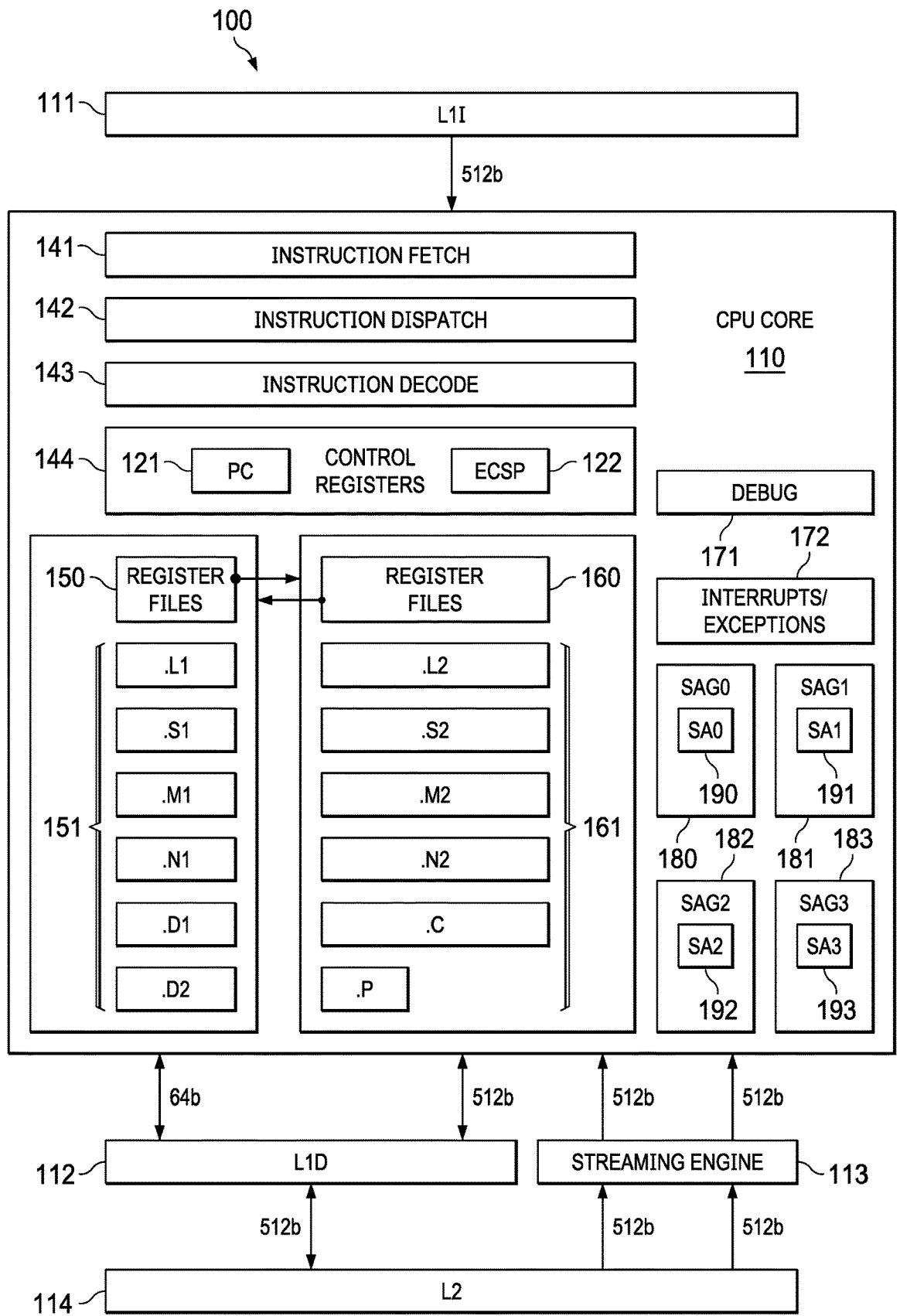
FIG. 1 illustrates a DSP according to embodiments described herein.

FIG. 1 illustrates a block diagram of DSP 100, which includes vector CPU core 110. As shown in FIG. 1, vector CPU 110 includes instruction fetch unit 141, instruction dispatch unit 142, instruction decode unit 143, and control registers 144. Vector CPU 110 further includes 64-bit register files 150 (for example, designated registers A0 to A15 and D0 to D15) and 64-bit functional units 151 for receiving and processing 64-bit scalar data from level one data cache (L1D) 112. Vector CPU 110 also includes 512-bit register files 160 and 512-bit functional units 161 for receiving and processing 512-bit vector data from level one data cache (L1D) 112 and/or from streaming engine 113. Vector CPU 110 may also include debug unit 171 and interrupt logic unit 172.

DSP 100 also includes streaming engine 113. As described in U.S. Pat. No. 9,606,803 (hereinafter "the '803 patent"), incorporated by reference herein in its entirety, a streaming engine such as streaming engine 113 may increase the available bandwidth to the CPU, reduces the number of cache misses, reduces scalar operations and allows for multi-dimensional memory access. DSP 100 also includes, in the vector CPU 110, streaming address generators 180, 181, 182, 183. As described in more detail in a U.S. patent application entitled, "Streaming Address Generation" (hereinafter "the Streaming Address Generation application"), filed concurrently herewith, and incorporated by reference herein, the streaming address generator 180 generates offsets for addressing streaming data. While FIG. 1 shows four streaming address generators, as described in the concurrently filed application, there may one, two, three or four streaming address generators and, in other examples, more than four. As described in the Streaming Address Generation application, offsets generated by streaming address generators 180, 181, 182, 183 are stored in streaming address offset registers SA0 190, SA1 191, SA2 192 and SA3 193, respectively.

The control registers 144 include a program counter (PC) register 121 and, optionally, one or more event context stack pointers (ECSP) 122. The ECSP register 122 is used by the DSP to save and restore event handler context when a higher priority event preempts a lower priority event handler. The ECSP register 122 preserves context in the event of interrupts and contain the address used to stack machine status when an event is detected. FIG. 2 illustrates an exemplary ECSP register, which includes an address 21 and a nested interrupt counter 22.

To write data from the CPU, a store operation is typically used. To read data into the CPU, a load operation is typically used. To indicate the address in memory for reading or writing data, a base address is typically provided as an operand, and optionally an offset.

The base address register can be any of A0-A15 (preferably A0-A15), D0-D15 64-bit scalar registers. Such registers are collectively referred to hereinafter as "baseR." The program counter (PC) or event context stack pointer (ECSP) control registers can also be used as the base address register.

The base address register may also be a 64-bit register. In this case, because the virtual address size is typically 49-bits, the remaining upper bits (e.g., 15 bits) of this register are not used by the address generation logic or uTLB lookup. However, those bits are checked to make sure they are all 0's or all 1's, if not, an address exception may be generated.

A constant offset can be a scaled 5-bit unsigned constant or a non-scaled signed 32-bit constant. This value may be scaled by the data type, e.g., element size (shift by 0, 1, 2, or 3 if the element size is Byte, Half-Word, Word or Double-Word respectively) and the result (up to 35-bits result after the shift) may be sign-extended the rest of the way to 49 bits. This offset may then added to the base address register. The offset value may default to 0 when no bracketed register or constant is specified.

Load and store instructions may use for the offset, for example, the A0-A15 (preferably A8-A15), D0-D15 registers. ADDA/SUBA instructions, which perform linear scaled address calculation by adding a base address operand with a shifted offset value operand, can use, for example, the A0-A15, D0-D15 registers. Collectively, the valid register offset is denoted as offsetR32. The streaming address offset registers SA0 190, SA1 191, SA2 192 and SA3 193 may also be used for the offset for load, store, ADDA or SUBA instructions. Streaming address offset registers SA0 190, SA1 191, SA2 192 and SA3 193 can be used with or without advancement. Exemplary syntax used for advancement of streaming address offset register SA0 is "SA0++", which will advance the offset after it is used to the next offset, as described in the Streaming Address Generation application.

Postincrement addressing updates the base register by a specified amount after address calculation. For postincrement addressing, the value of the base register before the addition is the address to be accessed from memory. Post increment operation of the base address register is denoted as baseR++. Such an operation will increment the base register by one addressed element size after the value is accessed.

Using the program counter 121 as the base address may be referred to as PC-relative addressing mode. PC-relative references may be relative to the PC of the fetch packet containing the reference. This may be true for an execute packet spanning fetch packet as well, where the PC reference may be relative to the fetch packet which contains the instruction that has the PC-relative addressing mode. Specifically, the address that is used for the base address when using the PC relative addressing mode is, in at least one example, the address of the fetch packet containing the .D unit instruction that has the PC relative addressing mode.

For example, for this code sequence:

LDW .D1 *PC[0x30], A0

|| LDW .D2 *PC[0x34], A1

If the instruction on .D1 and the instruction on .D2 are in different fetch packets due to spanning, then they will end up using different values for the PC.

Using an ECSP 122, shown in FIG. 2, as the base address provides the benefit that the address will be preserved in the event of interrupts, or even nested interrupts.

Table 1 shows addressing modes for load and store operations according to examples described above:

| Addressing type | No modification of base address register | Post-increment |
| --- | --- | --- |
| Register indirect, no offset | baseR[0] | baseR++[0]<br>base register incremented by element size |
| Register indirect, offset by access size in bytes | baseR | baseR++<br>base register incremented by element size |
| Register relative with 5-bit unsigned constant offset, scaled | baseR[ucst5] | baseR++[ucst5]<br>base register incremented by ucst5 constant |
| Register relative with 32-bit signed constant offset, unscaled | baseR(scst32) | baseR++(scst32)<br>base register incremented by scst32 constant |
| Register relative with 32-bit register index, scaled | baseR[offsetR32] | baseR++[offsetR32]<br>base register incremented by offset |
| Register relative with Streaming Address Generator as register index, scaled | baseR[SA] | baseR[SA++]<br>advances SA by one iteration, base register unchanged |
| Program Counter Register relative with 5-bit unsigned constant offset, scaled | PC[ucst5] | Not Supported |
| Program Counter Register relative with 32-bit signed constant offset, unscaled | PC(scst32) | Not Supported |
| Event Context Stack Pointer Register relative with 5-bit unsigned constant offset, scaled | ECSP[ucst5] | Not Supported |
| Event Context Stack Pointer Register relative with 32-bit signed constant offset, unscaled | ECSP(scst32) | Not Supported |

By limiting the addressing modes to only a few options and by including only post-increment (i.e., no pre-increment or pre-/post-decrement), design verification spaces are reduced, and fewer opcode bits are needed.

Modifications are possible in the described embodiments, and other embodiments are possible, within the scope of the claims.

What is claimed is:

1. A processor comprising:
   a memory;
   a control register including a program counter register and an event context stack pointer (ECSP) register;
   an interrupt logic unit configured to detect an event and, based on the event, cause a first address to be stored in the ECSP register; and in response to receiving a memory access request that specifies a base address register from among the program counter register and the ECSP register, the processor is configured to:
  determine a second address associated with the memory access request based on the base address register; and
  access the memory using the second address.

2. The processor of claim 1, wherein:
the memory access request includes a write request to the second address in the memory or a read request from the second address in the memory.

3. The processor of claim 1, wherein:
the event includes a preemption of a low priority event by a high priority event.

4. The processor of claim 1, wherein:
the processor is configured to check bits of the base address register to determine a pass result or a fail result; and
in response to the fail result, the processor is configured to generate an address exception.

5. The processor of claim 1, wherein:
the ECSP register is configured to store an offset.

6. The processor of claim 1, wherein:
the base address register is not incremented or decremented prior to accessing the memory with the base address register.

7. A processor comprising:
a memory;
a control register including a program counter register and an event context stack pointer (ECSP) register; and
an interrupt logic unit configured to detect an event; wherein:
  in response to receiving a memory access request, the processor is configured to select between the program counter register and the ECSP register to determine a base address register to access the memory, wherein the processor selects the ECSP register in response to the event being detected by the interrupt logic unit;
  the ECSP register includes a nested interrupt counter; and
  the nested interrupt counter is configured to store an offset.

8. The processor of claim 7, wherein:
the offset is selectively scaled based on a data type.

9. The processor of claim 8, wherein:
the data type includes an element size.

10. The processor of claim 9, wherein:
in response to the data type having the element size of a byte, the offset shifts a value in the base address register by zero;
in response to the data type having the element size of a half-word, the offset shifts the value in the base address register by one;
in response to the data type having the element size of a word, the offset shifts the value in the base address register by 2; and
in response to the data type having the element size of a double-word, the offset shifts the value in the base address register by 3.

11. A method for addressing data in a memory, the method comprising:
detecting, by an interrupt logic unit of a processor, an event;
based on the event, storing a first address in an event context stack pointer (ECSP) register;
receiving, by a processor, a memory access request that specifies a base address register from among the ECSP register and a program counter register; and
determining, by the processor, a second address associated with the memory access request based on the base address register.

12. The method of claim 11, wherein:
the memory access request includes a write request to the second address in the memory or a read request from the second address in the memory.

13. The method of claim 11, wherein:
the event includes a preemption of a low priority event by a high priority event.

14. The method of claim 11, wherein:
the processor is configured to check bits of the base address register to determine a pass result or a fail result; and
in response to the fail result, the processor is configured to generate an address exception.

15. The method of claim 11, wherein:
the ECSP register is configured to store an offset.

16. The method of claim 11, wherein:
the base address register is not incremented or decremented prior to accessing the memory with the base address register.

17. The method of claim 15, wherein:
the ECSP register includes a nested interrupt counter; and
the offset is stored by the nested interrupt counter.

18. The method of claim 17, wherein:
the offset is selectively scaled based on a data type.

19. The method of claim 18, wherein:
the data type includes an element size.

20. The method of claim 19, wherein:
in response to the data type having the element size of a byte, the offset shifts a value in the base address register by zero;
in response to the data type having the element size of a half-word, the offset shifts the value in the base address register by one;
in response to the data type having the element size of a word, the offset shifts the value in the base address register by 2; and
in response to the data type having the element size of a double-word, the offset shifts the value in the base address register by 3.

* * * * *